United States Patent [19]

Hicks, Jr. et al.

[11] 4,009,920
[45] Mar. 1, 1977

[54] POWER TAP-OFF UNIT FOR USE AT A SINGLE-BOLT JOINT IN A BUSWAY SYSTEM

[75] Inventors: Loy A. Hicks, Jr., Cedarburg; Franklin R. Welch, Wauwatosa, both of Wis.

[73] Assignee: Cutler-Hammer, Inc., Milwaukee, Wis.

[22] Filed: Apr. 26, 1976

[21] Appl. No.: 680,594

[52] U.S. Cl. .......................... 339/22 B; 174/88 B
[51] Int. Cl.² .......................................... H01R 9/12
[58] Field of Search ............................. 339/20–24; 174/71 B, 88 B

[56] References Cited
UNITED STATES PATENTS

| | | | |
|---|---|---|---|
| 3,339,009 | 8/1967 | Hicks | 339/22 B |
| 3,408,454 | 8/1968 | Fouse | 339/22 B |
| 3,786,394 | 1/1974 | Koenig | 339/22 B |

*Primary Examiner*—Roy Lake
*Assistant Examiner*—Mark S. Bicks
*Attorney, Agent, or Firm*—Hugh R. Rather; William A. Autio; Michael E. Taken

[57] ABSTRACT

A branch electrical connection is made at any selected joint of a busway run without disturbing the joint connection in any manner apart from removing a side housing cover plate. A unitary connector assembly is plugged into the exposed side of the joint and bolted to the bus duct housing using the existing bolt holes provided for the joint cover.

10 Claims, 7 Drawing Figures

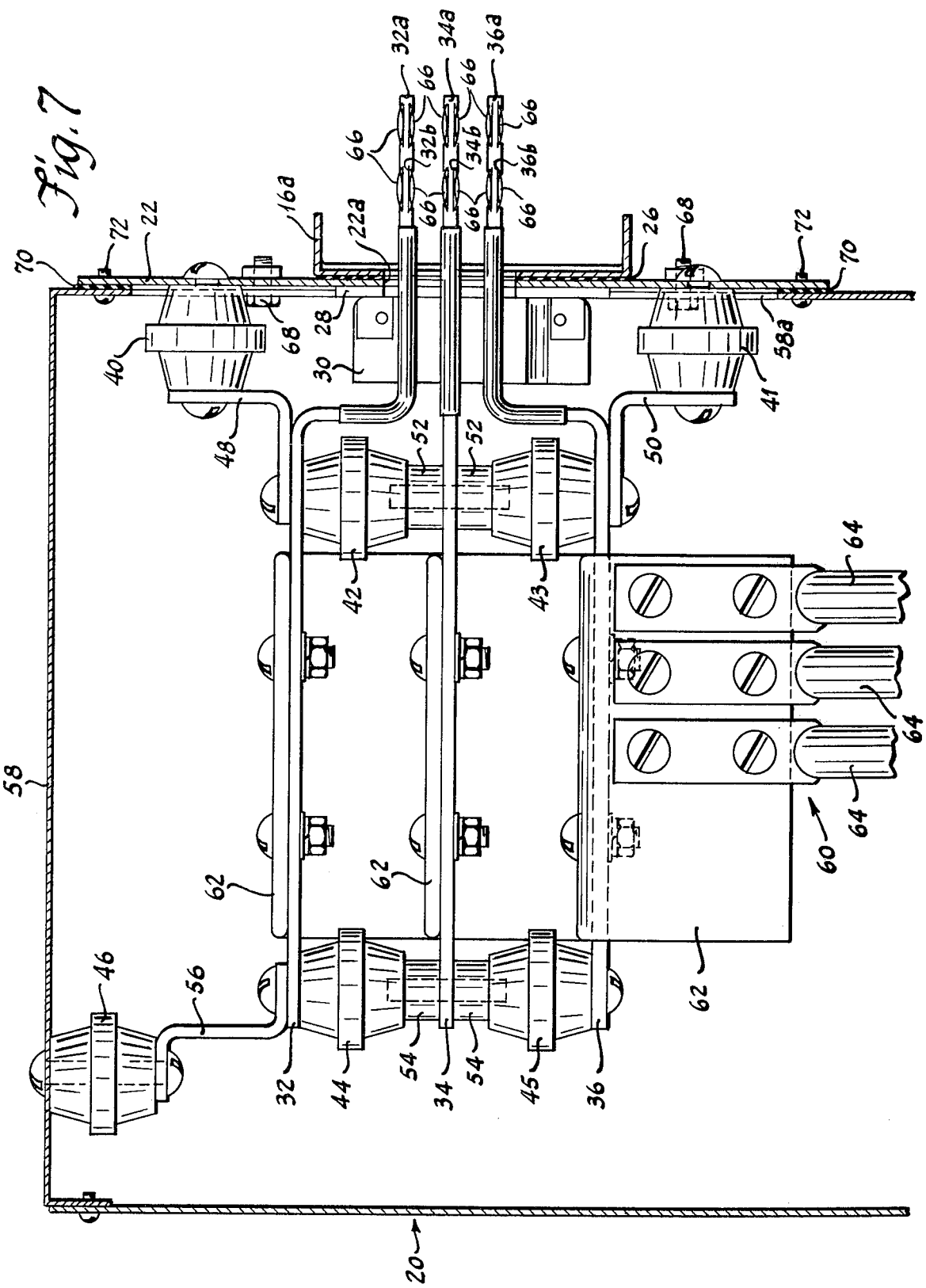

POWER TAP-OFF UNIT FOR USE AT A SINGLE-BOLT JOINT IN A BUSWAY SYSTEM

BACKGROUND OF THE INVENTION

This invention relates to busway systems and is primarily directed to solving the problem of making a branch connection in an existing busway run. The present methods of accomplishing branch connections require the substitution of either a bus duct section or of a joint assembly with a similar item which has provisions for the branch, or tap-off connection. These methods require the loosening of at least one joint assembly, and the physical removal of either a bus duct section or the joint.

The power tap-off unit of this invention permits a branch connection to be made at any selected joint in the bus duct run, and to be made without loosening that joint connection or removing a joint or a bus duct section. The only item necessary to be removed is a side housing cover plate used to enclose the electrical members of the joint, the cover plate forming no part of the electrical connection between the bus ducts.

SUMMARY OF THE INVENTION

It is therefore the intent and purpose of this invention to provide a power tap-off unit for a bus duct which may be physically and electrically connected at a single-bolt joint without disturbing the joint connection.

It is an object of this invention to provide a power tap-off unit of the aforedescribed type which substitutes only a housing member of the existing joint, thereby reducing the unusable scrap.

BRIEF DESCRIPTION OF THE DRAWINGS

FIG. 7 is an end view of the power tap-off unit with the enclosing case thereof broken away.

DESCRIPTION OF THE PREFERRED EMBODIMENT

Figure 1:
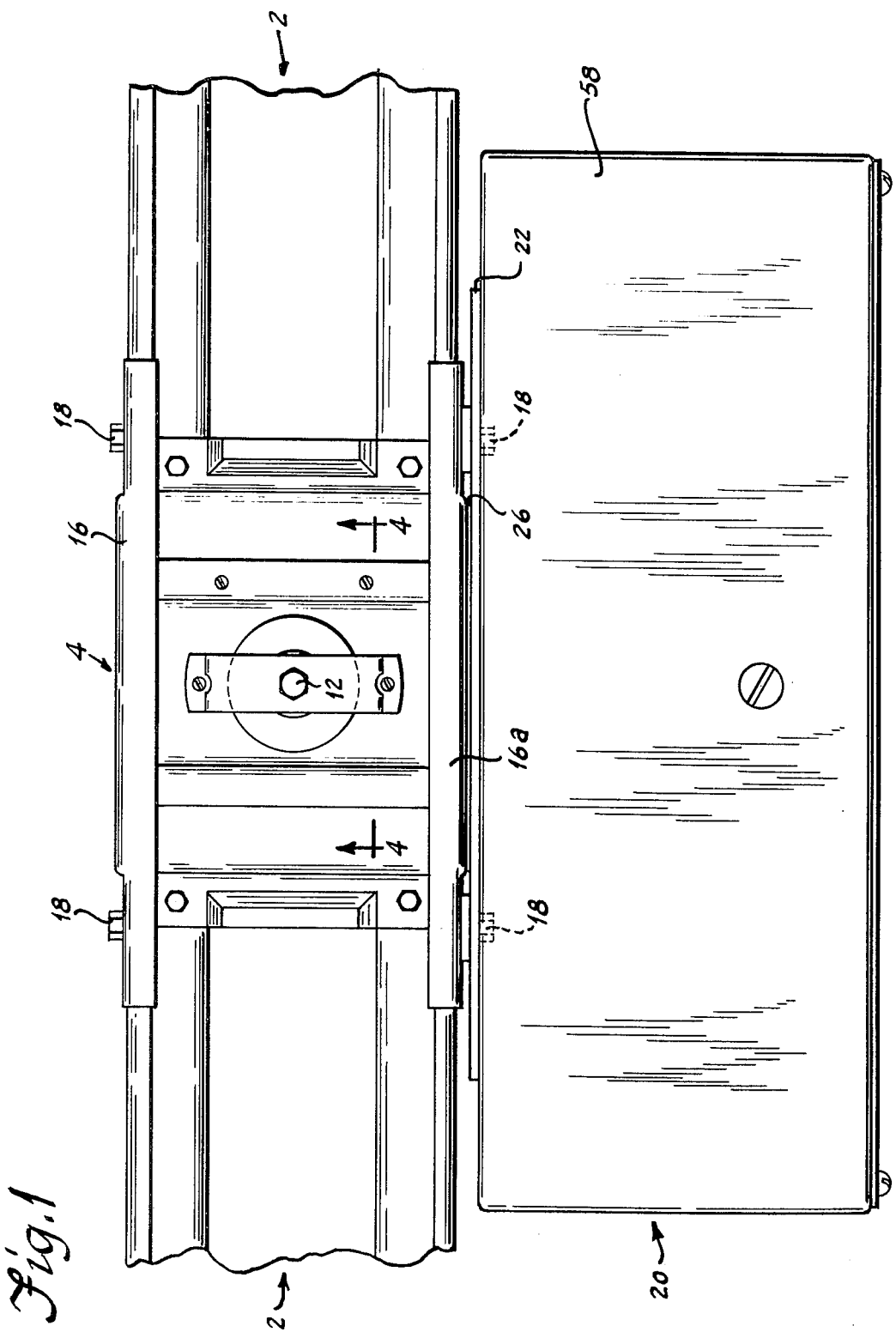
FIG. 1 is a top plan view of a single-bolt busway joint connected between two sections of feeder bus duct and having the power tap-off unit of this invention connected thereto.
Figure 2:
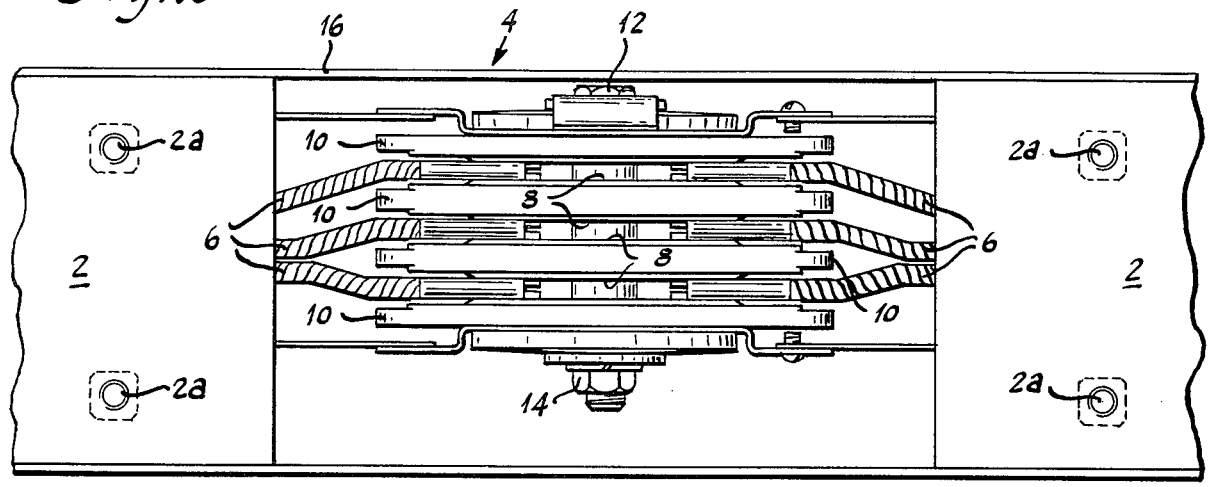
FIG. 2 is a front elevational view of the single-bolt joint and feeder bus ducts of FIG. 1 with the power tap-off unit removed.

With reference to the drawings, and particularly to FIGS. 1 and 2, a portion of a busway run is shown wherein two feeder bus duct sections 2 are connected by a single-bolt joint assembly 4. For purposes of this invention, the joint assembly 4 may also be one jointing two plug-in bus duct sections, a feeder duct to a plug-in duct, or other such bus duct connections known in the art. Bus duct sections 2 are of the type shown and described in U.S. Pat. No. 3,639,676 issued Feb. 1, 1972 to George A. Dempsey, Jr. et al. and assigned to the assignee of this application. Each section 2 generally comprises a plurality of individually insulated bus bars 6 assembled in surface-to-surface contact along the flat length thereof and encased by a metal housing. The sections 2 are manufactured in standardized lengths, such as 10 feet, and are joined together end-to-end to provide the required length for a busway run. For connection purposes, the ends of the bus bars are left uninsulated and are outwardly offset.

Single-bolt joint assembly 4 is of the type shown and described in U.S. Pat. No. 3,786,394 issued Jan. 15, 1974 to Martin F. Koenig et al. and assigned to the assignee of this application. Joint assembly 4 comprises a stack of electrically conductive splice plates 8 arranged in cooperative pairs to receive the ends of corresponding bus bars 6 therebetween, and a plurality of insulator plates 10 disposed between adjacent pairs of splice plates and on the outer ends of the stack to insulate the bus bars from each other and from the metal housing. A bolt 12 extends through the joint assembly and receives a hex nut 14 on its projecting lower end. Nut 14 is tightened to compress the joint assembly, thereby compressing the splice plates 8 together upon the ends of bus bars 6. To complete the joint assembly a pair of metal housing cover plates 16 (only one shown in the drawings) are attached to the bus duct housings to span the sides of joint assembly 4 and thereby close it off, the cover plates each being secured by four bolts 18 which take into threaded openings 2a in the bus duct housings. Reference may be had to the aforementioned patents for a further understanding of the feeder bus duct or the single-bolt joint.

To attach a power tap-off unit 20 of this invention to a joint assembly 4, one of the cover plates 16 is required to be removed. This condition is illustrated in FIG. 2 wherein it may be seen that the splice plates 8 and bus bars 6 are directly accessible. As will be explained in detail later, the electrical connectors of the power tap-off unit 20 are received within lateral openings defined vertically by each cooperating pair of splice plates and longitudinally by the spacing between the associated bus bars.

Figure 3:
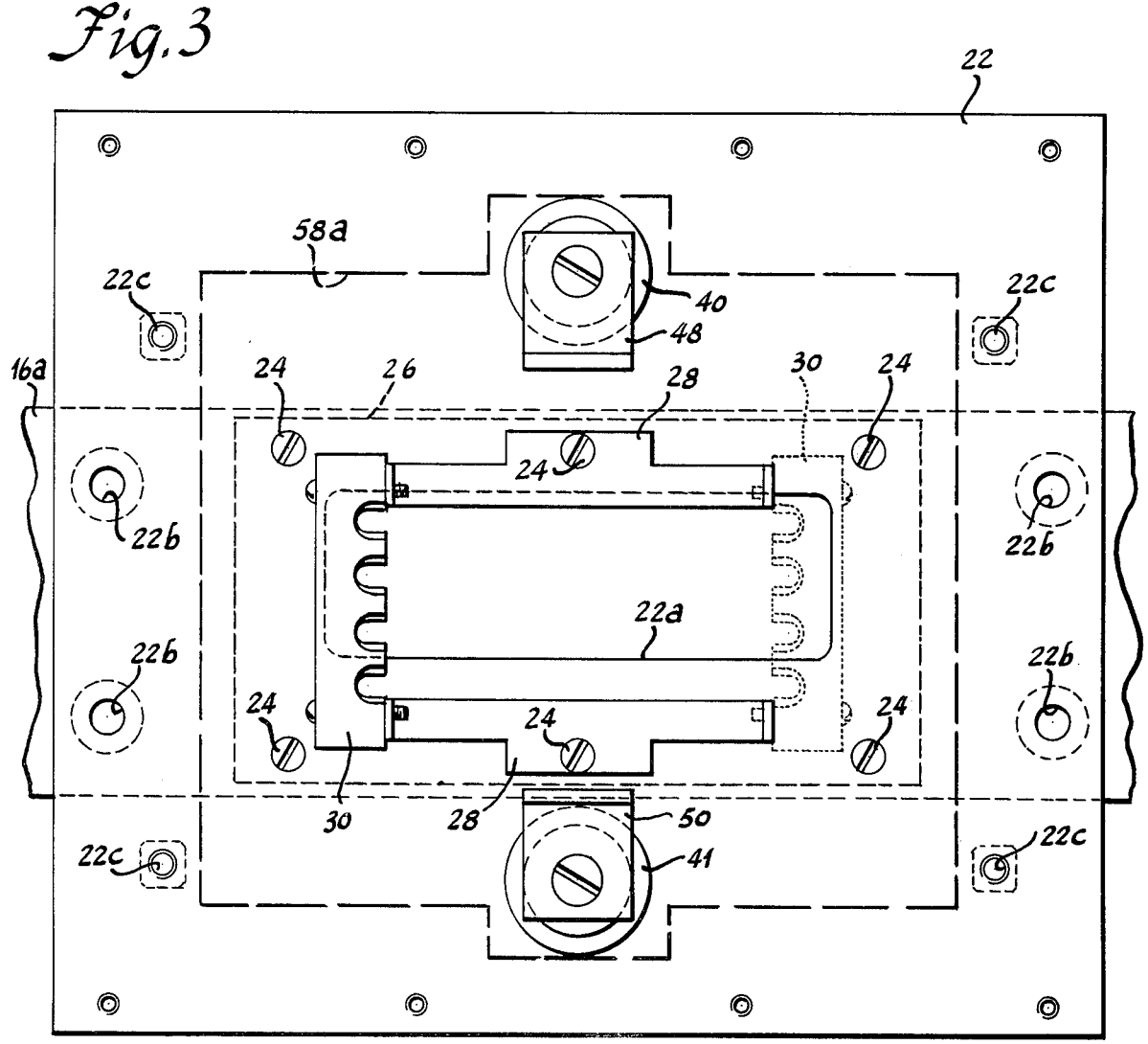
FIG. 3 is a front elevational view of a mounting plate assembly for the power tap-off unit.

The power tap-off unit 20 is constructed upon a main mounting plate 22 shown in FIG. 3. Mounting plate 22 has a rectangular shaped central aperture 22a. A cover plate 16a, identical to the plate 16 but modified to include an aperture corresponding to aperture 22a, is attached to the rear of mounting plate 22 by six self-tapping screws 24. A gasket 26 is provided between the cover plate 16a and mounting plate 22 around the aperture 22a. Mounting plate 22 also has four bolt holes 22b which align with the corresponding bolt holes in the cover plate 16a and with the threaded holes 2a in the housings of bus ducts 2 for securing the tap-off unit to the busway as will be explained in detail later.

A pair of elongated U-shaped brackets 28 are welded to the mounting plate 22 at the top and bottom of aperture 22a. A pair of insulating branch connector supports 30 are fastened to the outer legs of brackets 28, the supports 30 extending along the sides of aperture 22a between the respective legs of upper and lower brackets 28. Supports 30 are formed with a plurality of vertically spaced grooves in their facing surfaces to receive the lateral edges of branch connector plates as will be hereinafter explained.

Figure 4:
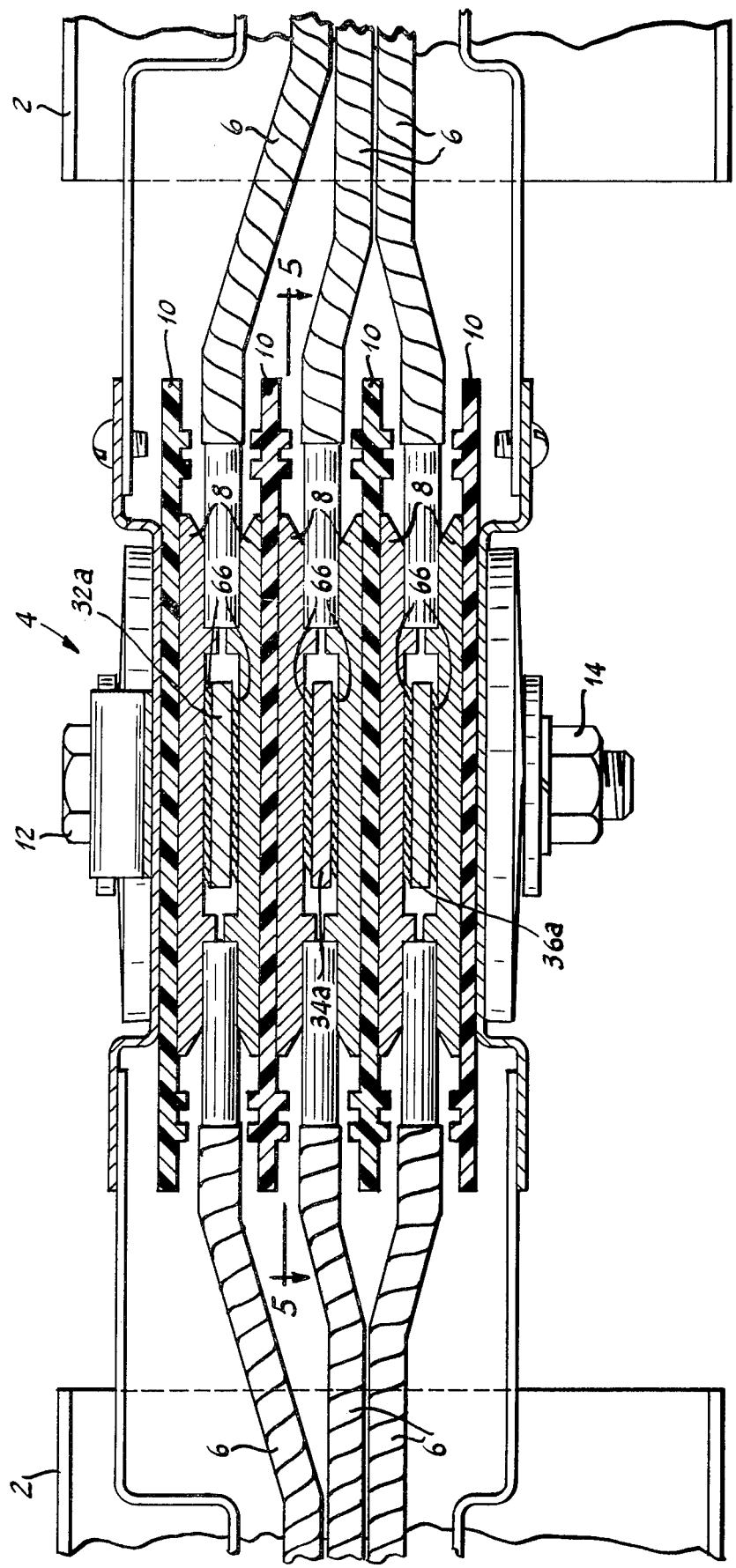
FIG. 4 is a longitudinal section through the joint assembly taken along line 4—4 of FIG. 1.
Figure 5:
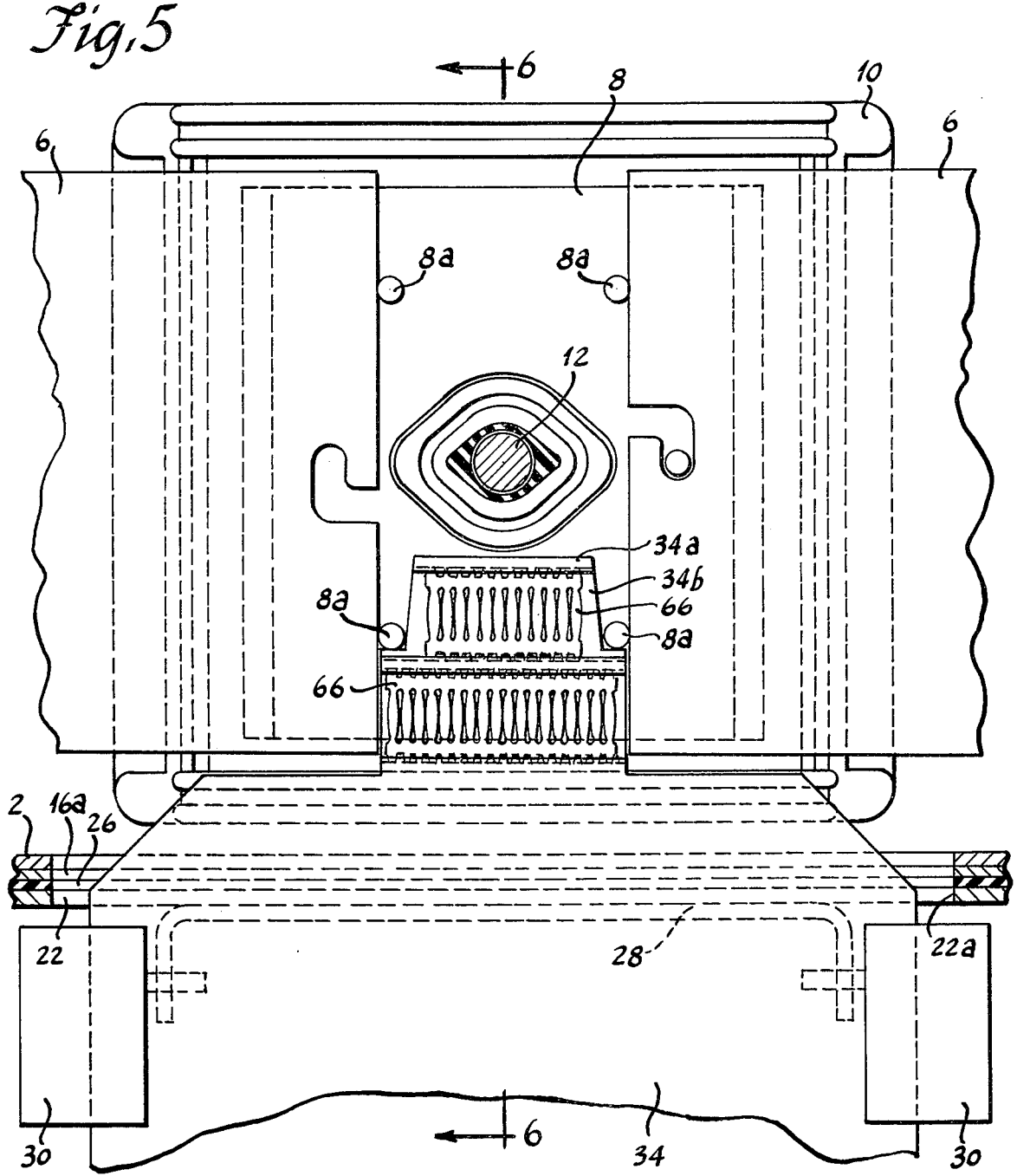
FIG. 5 is a longitudinal section taken along the line 5—5 of FIG. 4 showing the interconnection between a splice plate, corresponding bus bars and a branch connector plate.
Figure 6:
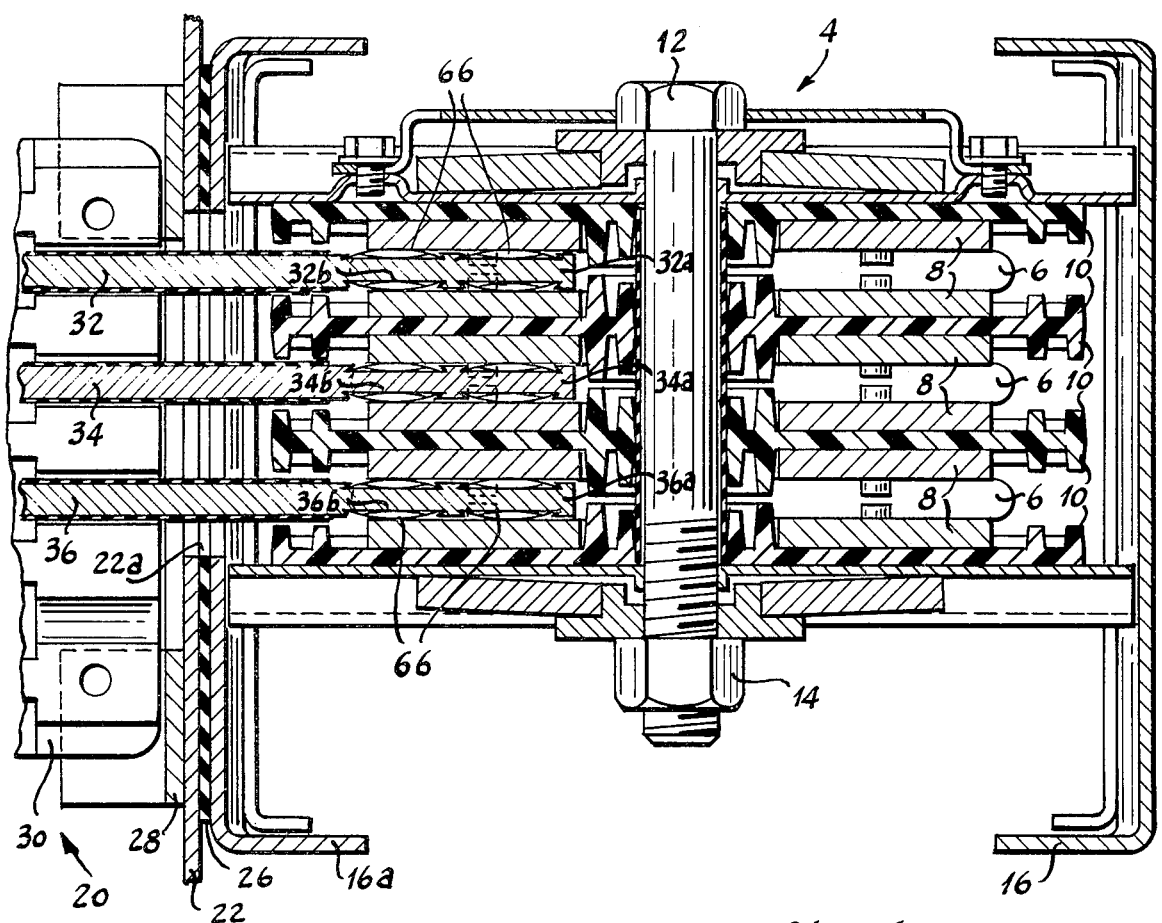
FIG. 6 is a transverse cross-sectional view of the joint and branch connection taken along the line 6—6 of FIG. 5.

The tap-off unit shown in the drawings has three branch connector plates 32, 34 and 36. Units with four connector plates can readily be made by forming the aperture 22a deeper so that it can accommodate the fourth plate. As seen in FIGS. 4–6, branch connector plates 32, 34 and 36 are substantially wide flat plates of good electrical conducting material such as copper or the like, and are insulated along an intermediate section. Upper and lower plates 32 and 36 are outwardly offset to provide greater clearances from the center plate 34 within the tap-off unit enclosing case. The opposite ends of plates 32, 34 and 36 have reduced width plug-in blade portions 32a, 34a and 36a, respectively, for connection with the joint assembly 4 as will be more fully described later.

As best seen in FIG. 7, connector plates 32, 34 and 36 are supported on mounting plate 22 by a bolted system of insulators, spacers and brackets. Insulators 40–46 are identical barrel-shaped members each having blind, co-axial threaded openings formed in their opposite ends. One pair of insulators 40 and 41 are bolted directly to the mounting plate 22 above and below the aperture 22a. The opposite ends of insulators 40 and 41 have L-shaped brackets 48 and 50 bolted thereto. A second pair of insulator members 42 and 43 are bolted together to the opposite sides of center branch connector plate 34 near the midportion thereof by a threaded stud which extends through a bolt hole in the connector plate 34. Tubular phenolic spacers 52 are positioned between the insulators 42, and 43 and the connector plate 34, respectively, to provide a desired heighth for the opposite ends of the insulators. In the same manner, a third pair of insulators 44, 45 and spacers 54 are attached to the end of center connector plate 34. Upper and lower plates 32 and 36 and brackets 48 and 50 are subsequently bolted to the insulators 42 and 43. The outer ends of upper and lower plates 32, and 36 are similarly bolted to insulators 44 and 45, respectively, the upper plate connection also including the lower leg of a Z-shaped bracket 56. An insulator 47 is bolted to the upper leg of bracket 56 for subsequent attachment to the upper wall of an enclosing case 58 for the power tap-off unit 20 when the case 58 is attached to the mounting plate as will be hereinafter described. The insulated intermediate portions of branch connector plates 32, 34 and 36 are received within corresponding grooves of the insulators 30 and clamped therebetween to provide support and spacing for the plug-in blade portion ends of the plates.

Each branch connector plate 32, 34 and 36 further receives a wiring connector assembly 60. The exact form of assembly 60 will vary according to the type of usage of the tap-off unit. An exemplary form is shown in the drawings as an L-shaped plate 62 having a plurality of wire connector lugs 64 attached thereto. The length of the legs of L-shaped plates 62 are varied to provide longitudinal spacing between the depending legs of two such plates projecting to the same side of the unit and to terminate the lower ends thereof in a uniform plane. As may be seen in the drawings, each wiring connector assembly is bolted to its respective branch connector plate in the area between insulators 42, 43 and 44, 45, respectively.

The plug-in blade portions 32a, 34a and 36a of the branch connector plates are provided with dovetail grooves 32b, 34b and 36b, respectively, in their opposite surfaces. Each groove receives a strip 66 of louvered contact material therein, the strips having a plurality of angularly offset lateral tabs for retention in the grooves. To prevent the strips 66 from falling out or being removed from the grooves, the opposite corners of each groove may be upset with a hand punch or other similar staking operation. Louvered contact strips 66 are of the type shown and described in U.S. Pat. No. 3,453,587 issued July 1, 1969, to R. Neidecker. The strips 66 are formed of thin material, such as 0.008 inch berillium brass, which has good mechanical spring qualities and electrical conduction qualities. The latter may be further enhanced by silver plating the strip. The louvers are formed by arcuate transverse slits in the strip and subsequent twisting thereof to approximately 45°, thereby to present louvered edges at both the top and bottom of each strip.

As mentioned before, the joint assembly 4 has lateral openings defined by the cooperating pairs of splice plates 8 and their associated bus bars 6. As seen best in FIG. 5, the ends of bus bars 6 are inserted longitudinally into the joint to a depth determined by nibs 8a formed on the splice plates 8. Accordingly, the longitudinal width of the openings is defined by the ends of the corresponding bus bars and the inside distance between the nibs 8a. The heighth of the openings is defined by the thickness of the bus bars. Accordingly, the plug-in blade portions 32a, 34a and 36a have a stepped width as determined by the aforementioned factors, which also provides transverse shoulders to cooperate with the nibs 8a for controlling the depth of insertion of the blade portions into the joint assembly.

The thickness of the blade portions 32a, 34a and 36a is chosen such that the overall heighth thereof over the crown of the louvers is slightly greater than the width of bus bars 6. Accordingly, the openings between the splice plates 8 affords an interference fit for the branch connector plate plug-in blade portion assembly. In view of the relatively light spring pressure provided by each individual louver, the insertion force for the connector plates is very low. When inserted, each louver engages both the blade portion of the branch connector plate within the respective groove and the splice plate to provide a good electrical connection therebetween, the plurality of louvers thereby providing a plurality of such connections. Thus, the high amperage capacity of the bus bars can be accommodated by the multitude of individual connections provided by the individual louvers without the large compressive force required for flat surface connections such as those between the bus bars 6 and splice plates 8. Another significant advantage is that it is not necessary to loosen and re-tighten the bolted joint assembly to permit insertion of the connector members.

As mentioned before, the installation of the power tap-off unit 20 may be accomplished at any selected joint 4 in the busway run. To accomplish this, the bolts 12 and cover plate 16 are removed from one side of the selected joint assembly 4. With the original cover plate 16 removed, the power tap off unit 20 comprising mounting plate 22 with modified cover plate 16a and branch connector plates 32, 34 and 36 secured thereto, is plugged into the side of joint 4 to have the blade portions 32a, 34a and 36a of branch connector plates 32, 34 and 36 received within the aforementioned lateral openings in the joint 4. Bolts 12 are then inserted through the holes 22b in the mounting plate 22 and aligned holes in the cover plate 16a to take into threaded holes 2a in the bus duct housing, which holes previously received the bolts for cover plate 16.

The enclosing case 58 for the power tap-off unit 20 is attached to the mounting plate 22 after the unit 20 is firmly secured to the busway as described above. The case 58 is provided with an opening 58a shown in dashed lines in FIG. 3 in the rear wall thereof which is sufficient in size to permit the case to be positioned over the assembly of connector plates, wiring connectors and insulators. The case 58 is secured to the mounting plate by bolts 68 which take into threaded holes 22c on the mounting plate 22. To seal the joint between the enclosing case 58 and mounting plate 22, gasket strips 70 are provided along the top and bottom edges of the mounting plates and a plurality of screws 72 are employed to take into holes in the mounting plate to draw the case tightly thereto. With the case 58 firmly in place, the insulator 46 is bolted to the top wall of the case to provide additional support for the connectors. The installer can then set about making the required electrical connections to the lugs 64.

While the apparatus hereinbefore described is effectively adapted to fulfill the objects stated, it is to be understood that the invention is not intended to be confined to the particular embodiment of power tap-off unit disclosed, inasmuch as it is susceptible of various modifications without departing from the scope of the appended claims.

We claim:

1. A branch connection for an electrical busway system comprising, in combination:
    a first set of bus bars arranged in aligned correspondence with and longitudinally spaced from a second set of bus bars;
    electrically conductive splice plates joining corresponding bus bars of said first and second sets, said splice plates being arranged in cooperative pairs disposed on opposite sides of respective corresponding bus bars;
    means compressing said splice plates together upon said respective corresponding bus bars to form a rigid connection therewith, each connection establishing a lateral opening defined by the longitudinal space between the respective bus bars and by the associated pair of said splice plates;
    branch connector plates arranged transversely to and in aligned correspondence with the bus bars of said first and second sets, said connector plates having portions received within said lateral openings; and
    a multiplicity of electrical connectors resiliently disposed between said connector plate portions and said splice plates within the respective lateral openings, each of said connectors providing an electrical connection between said splice plates and respective ones of said connector plates.

2. The combination according to claim 1 wherein said electrical connectors are carried on said portion of said connector plates.

3. The combination according to claim 1 wherein said electrical connectors are carried on the opposite sides of said portion of said connector plates.

4. The combination according to claim 3 wherein said electrical connectors comprise segments of a strip offset from the plane of said strip.

5. The combination according to claim 3 wherein said electrical connectors comprise louvers formed in a strip secured to said portions of said connector plates, said louvers each engaging said splice plate and said portion along opposite edges thereof.

6. The combination according to claim 1 wherein said connector plates are laterally removable and insertable into said openings without loosening said means compressing said splice plates together upon said bus bars.

7. The combination according to claim 6 wherein said connector plates are secured together for removal or insertion into respective ones of said openings as a unit.

8. A power tap-off unit for making a branch electrical circuit connection to a busway joint, wherein said joint comprises a plurality of electrically conductive splice plates arranged in pairs to engage the opposite surfaces of longitudinally spaced corresponding bus bars, and means compressing said splice plates together upon said bus bars for good electrical connection therebetween, said bus bars and said splice plates defining openings therebetween;
    said power tap-off unit comprising a plurality of spaced connectors having portions insertably received within said openings, said portions having resilient connector means for engagement with said splice plates; and means securing said unit to the busway at said joint.

9. The combination according to claim 8 wherein said resilient connector means comprises strips having segments offset in opposite directions from the plane thereof.

10. The combination according to claim 8 wherein said resilient connector means comprise louvered contact strips attached to said portions, said louvers each engaging respectively a splice plate and said portion along the opposite edges thereof.

* * * * *